United States Patent Office 3,843,540
Patented Oct. 22, 1974

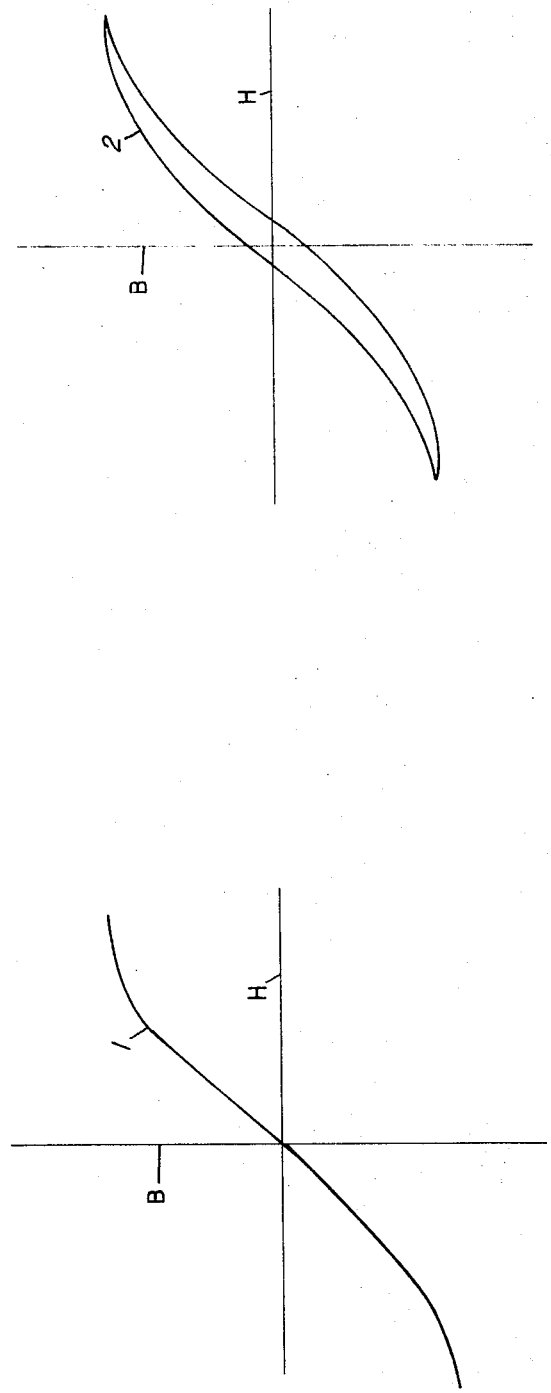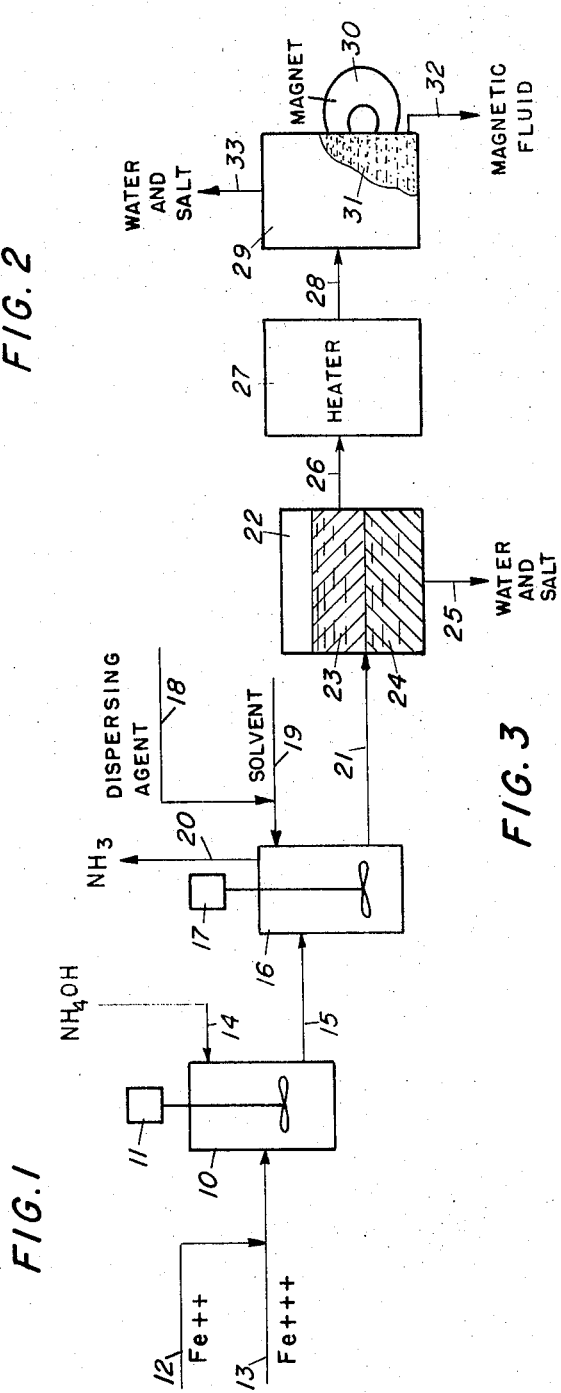

3,843,540
PRODUCTION OF MAGNETIC FLUIDS BY PEPTIZATION TECHNIQUES
George W. Reimers, Burnsville, and Sanaa E. Khalafalla, Minneapolis, Minn., assignors to the United States of America as represented by the Secretary of the Interior
Filed July 26, 1972, Ser. No. 275,382
Int. Cl. H01j 1/28
U.S. Cl. 252—62.52
26 Claims

ABSTRACT OF THE DISCLOSURE

Magnetic liquids are produced by reacting an aqueous solution of iron salts with a base to produce a precipitate of colloidal-sized, ferrimagnetic iron oxide particles; coating the particles thus formed with an adsorbed layer of a water soluble, but decomposable, dispersing agent; decomposing the dispersing agent to a non-water soluble form and dispersing the particles in a non-aqueous carrier liquid.

BACKGROUND OF THE INVENTION

Magnetic fluids, sometimes refered to as "ferrofluid" in the art, are Newtonian liquids which retain their fluidity in the presence of external magnetic fields and field gradients. The fluids are ultrastable colloidal suspensions of submicron-sized, ferro- or ferrimagnetic particles in liquid carriers such as hydrocarbons, particularly paraffinic hydrocarbons such as kerosene, silicones, fluorocarbons and the like. A definite test which characterizes magnetic fluids is their super paramagnetic behavior shown by the absence of a hysteresis loop in their magnetization curves. The magnetization curve of a magnetic fluid is in appearance a symmetrical sigmoid curve about the origin.

Magnetic fluids are conventionally produced by longterm grinding techniques such as those disclosed by Papell (U.S. 3,215,572). An alternative technique, also utilizing grinding, is disclosed and claimed in our copending, commonly assigned patent application Ser. No. 148,-206. Since grinding times required by the prior art methods range from days to several weeks, it is readily evident that these methods are cumbersome, costly and illsuited to any large scale production of magnetic fluids.

These fluids find use in a wide range of applications. They may be used in the separation of particulates according to density by such techniques as are shown in the Rosensweig Pat. No. 3,483,969 and by the method disclosed and claimed in our copending, commonly assigned patent application, Ser. No. 248,705. It has also been proposed to use oil soluble magnetic fluids for cleaning up oil spills. A magnetic fluid is added to an oil slick, imparting magnetic properties to the entire slick, after which the oil-magnetic fluid mixture is collected by means of an electromagnet. While this is an attractive and promising technique, its development and use has been severely hampered by the high cost of magnetic fluids. A detailed discussion of magnetic fluid properties and uses is found in an article by R. E. Rosensweig published in *International Science and Technology*, July, 1966, pages 48–56.

SUMMARY OF THE INVENTION

We produce magnetic fluids by precipitating ferrimagnetic iron oxide particles of colloidal size in an aqueous medium, coating the particles with an adsorbed layer of a dispersing agent and dispersing the particles in a nonaqueous fluid. The particles are coated while in aqueous suspension with a water soluble dispersing agent which is also heat decomposable to a non-water soluble form. After coating the particles, temperature of the aqueous suspension is increased to decompose the dispersing agent to its non-water soluble form. This causes coagulation of dispersion agent-coated magnetic particles in a gum-like mass. The coagulum may then be separated from the aqueous phase and dispersed in any non-aqueous liquid medium having solubility for the dispersing agent in its non-water soluble form. The resulting magnetic liquid comprises a stable, colloidal suspension of ferrimagnetic particles.

Alternatively, the non-aqueous medium, or carrier liquid, may be added to the aqueous suspension with the dispersing agent, or after its introduction, to form a magnetic fluid directly. The magnetic fluid may then be decanted from the aqueous phase and further heated to evaporate entrained water. Prefered dispersing agents include the long chain fatty acids; those acids in their ammonium salt form are water soluble but decompose at moderate temperatures to the acid form which is not soluble in water. Preferred carrier liquids include hydrocarbons generally; especially the saturated hydrocarbons of intermediate boiling point range. We particularly prefer to precipitate ferrimagnetic iron oxide particles approximating the composition of magnetite.

Hence, it is an object of our invention to produce magnetic fluids.

Another object of our invention is to manufacture magnetic fluids by precipitation and peptization techniques.

A specific object of our invention is to form ferrimagnetic particles of colloidal dimension, coat those particles with a dispersing agent and permanently suspend the coated particles in a non-aqueous liquid.

DETAILED DESCRIPTION OF THE INVENTION

Specific embodiments of our invention will be described with reference to the accompanying drawings in which:

FIG. 1 illustrates a magnetization curve typical of our magentic fluids.

FIG. 2 depicts the magnetization curve of fluid suspension of magnetic particles.

FIG. 3 comprises a diagrammatic flow sheet illustrating one embodiment of our process for the manufacture of magnetic fluids.

Figure 4:
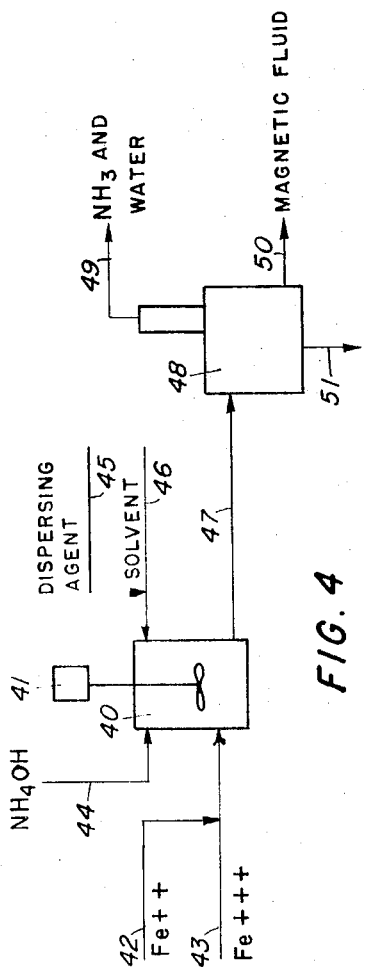

FIG. 4 depicts another embodiment of our process.

Figure 5:
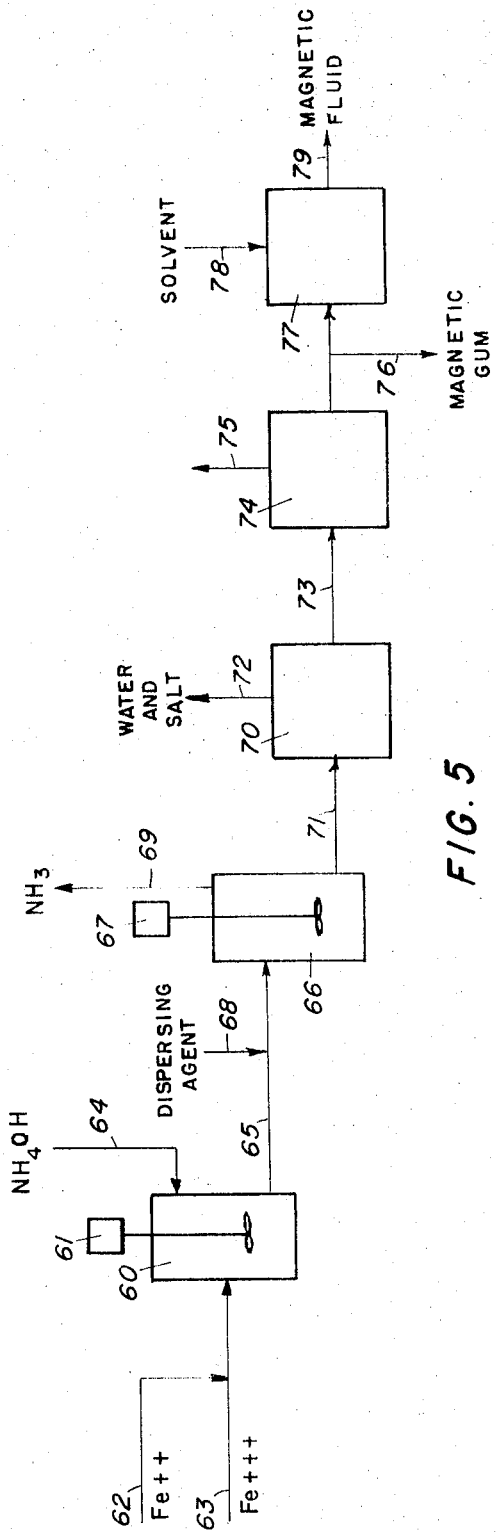

FIG. 5 diagrammatically represents a process embodiment in which a magnetic gum, or magnetic fluid concentrate, is formed.

The traditional approach taken to the manufacture of magnetic fluids has been the long term grinding of the smallest particle size magnetite available. We approached the problem from the opposite viewpoint; instead of making big particles little, we start on molecular scale and grow particles to the desired colloidal size. It is well known that colloidal-size particles of hydrated iron oxides are initially formed when aqueous solutions of iron salts are rapidly neutralized with a base such as sodium or ammonium hydroxide. There is much in the literature of analytical chemistry dealing with techniques to promote growth and coagulation of these colloidal precipitates so as to allow their filteration from liquids without loss. In our process the objectives are diametrically opposite; we maintain the "status quo" of the colloidal particles until they become peptized in the desired dispersion medium.

When making a gravimetric determination of iron, the analytical chemist tries to avoid the formation of colloids. Therefore he takes precautions, such as starting percipitation slowly, to insure that an excessive number of nuclei do not form. In this way, each particle nucleus can grow to a relatively large size, thus forming a crystalline precipitate which filters readily. Speed of crystallization and consequently the number of particles formed in a given system, can be controlled to some extent by the manner in which the reactants are mixed. The number of nuclei formed is a function of the amount by which the concentrations of the ions in a solution exceed the equilibrium value at the time precipitation begins. If precipitation is caused to occur very slowly it is possible, at least in theory, to obtain a single crystal.

In our invention, we deliberately proceed in a manner opopsite the advice given the analytical chemist. We precipitate the iron hydroxides rapidly, under conditions of excessive supersaturation and peferably at room temperature or below. We also avoid the aglomeration of colloidal particles, which would tend to form a gelatinous mass or gel, so that individual colloidal sized particles may be peptized to form a stable colloidal suspension in a liquid carrier medium.

Like magnetic fluids produced by grinding processes, our magnetic fluids comprise three basic components; colloidal sized particles of magnetite, a dispersing agent coating the individual magnetite particles and a liquid carrier medium compatible with the dispersing agent. Our process for making magnetic fluids comprises the following process steps (1) precipitation of an aqueous suspension of colloidal-sized ferroso-ferric oxide particles by the rapid neutralization of a mixed, ferrous-ferric salt solution by addition of a relatively strong base; (2) coating the precipitated ferroso-ferric oxide particles in the water phase with a dispersing agent; and (3) extracting the dispersing agent-coated oxide particles from the aqueous phase into another liquid to form a peptized, stable colloidal suspension of magnetite particles in a liquid carrier medium.

The first step is well known in the art. Precipitation may be accomplished using any relatively strong base but use of ammonium hydroxide is very much preferred. Dispersing agents useful in step 2 must fulfill several criteria; they must form an adsorbed coating on the surface of each magnetite particle sufficient to overcome the attracting force between particles which would otherwise produce flocculation, they must react with a cation to form a water soluble salt or soap and that water soluble salt or soap must decompose at relatively moderate temperatures to form a water-insoluble coating around each magnetite particle.

All of these criteria are met by a number of organic compounds which contain the carboxyl group, COOH. A preferred grouping of dispersing agents includes the fatty acids. Our most preferred group of dispersing agents comprises fatty acids having approximately 18 carbon atoms. Oleic, linoleic and linolenic acids, for example, give excellent results, are readily available in quantity and are relatively low in cost. It is not necessary to us pure compounds. Mixtures of fatty acids and other compounds containing the carboxyl group are readily available in the form of tall oils produced by the Kraft paper process. The by-products of these oils may be used as dispersing agents in our process and in some cases are preferred.

Fatty acids and similar compounds are insoluble in water. However, these same compounds form a salt or soap with cations such as ammonium or sodium which in turn are water soluble. The sodium salts or soaps are relatively temperature stable and are generally useless for our purposes. Ammonium salts or soaps are much less thermally stable and are strongly preferred. Ammonium oleate, for example, begins to decompose at about 78° C. with the evolution of ammonia gas.

After the precipitation of a colloidal suspension of iron oxide particles, the dispersing agent is added with heating. It is preferred to add the dispersing agent to the aqueous suspension at a temperature above about 70° C. The dispersing agent at this stage of the process must be in the form of its water soluble ammonium salt. When the precipitation is accomplished using an excess of ammonium hydroxide, as is preferred, the dispersing agent will form the corresponding ammonium salt by reacting with excess ammonium hydroxide contained in the solution. However, if some other base, such as sodium hydroxide is used for the precipitation step, then excess base must be removed from the slurry of precipitated iron oxides and ammonium hydroxide added prior to or with the introduction of the dispersing agent. Alternatively, the dispersing agent may be added in the ammoniated form, as ammonium oleate for instance, but it is preferred to operate with an excess of ammonium ion in solution at this stage of the process.

The ammoniated dispersing agent is adsorbed, probably as a monomolecular layer, on the surface of the oxide particles. Heating of the reaction mix is continued to a temperature level above the decomposition temperature of the ammoniated dispersing agent. At those temperatures, generally in the range of about 70° to 100° C., ammonia generated by decomposition of the ammoniated dispersing agent is expelled from the solution as a gas thus making the decomposition reaction go essentially to completion. As a result, there is produced a suspension of iron oxide particles individually coated with a layer of dispersing agent in its original form. For example, when oleic acid is used as a dispersing agent, ammonium oleate is produced by reaction with ammonium hydroxide contained in the precipitated iron oxide slurry. Iron oxide particles are coated with ammonium oleate and, upon further heating, the ammonium oleate decomposes releasing ammonia gas thus changing the particle coating to oleic acid.

As the dispersing agent decomposes, there occurs a coagulation of the individually coated particles to form a wax-like mass which tends to separate from the water phase. This wax-like mass or coagulum is essentially a magnetic fluid concentrate since, after water removal, it will form a magnetic fluid upon mixing with non-aqueous liquid carriers which display at least some solubility toward the dispersing agent. A wide variety of liquid carriers, or magnetic fluid mediums, may be used. These include the general class of hydrocarbons, silicone oils, many of the fluorocarbons and like compounds. Hydrocarbons are generally preferred as the carrier liquid since they combine the characteristics of dispersing agent compatibility, water immiscibility, low viscosity and economy which are important for most magnetic fluid applications. Among the hydrocarbons, liquid fractions of intermediate boiling point range such as kerosene and fuel oils are especially appropriate as the carrier liquid for magnetic fluids used in separatory processes.

Instead of adding a dispersing agent only to the iron oxide suspension, the dispersing agent may be added in admixture with the liquid carrier medium. In this embodiment, magnetic iron oxide particles are extracted from the water phase into the carrier liquid phase as the ammoniated dispersing agent decomposes. As decomposition is completed, there is formed a two phase system; an aqueous phase containing ammonium salts of the iron compound used and a non-aqueous magnetic fluid phase. The two phases may then be separated by settling and decantation to recover the magnetic fluid product.

Iron salts used as raw materials for our process must be water soluble. Preferred salts are the chlorides and sulfates because of their availability and economy. Presence of other metal ions, including those of manganese, chromium, nickel and copper are not detrimental provided that those other metal ions are present in relatively small amount. We particularly prefer industrial waste streams containing iron compounds as our source of raw material. Such waste streams are available in large volume at essentially no cost as by-products of steel pickling or etching operations and from the sulfate process for the production of titanium dioxide pigments. Magnetic fluids produced from pickling liquors, for example, were indistinguishable in characteristics from those produced using reagent chemicals.

Concentration of magnetic iron oxides in the magnetic fluids may be varied at will depending upon properties desired. As magnetite concentration within the fluid increases, so also does the saturation magnetization, viscosity and specific gravity. For most uses of magnetic fluids, a magnetite concentration ranging from about 5 to about 50 grams magnetite per 100 ml. fluid will be satisfactory. For example, a magnetic fluid containing 5 g. magnetite per 100 ml. fluid will display a saturation magnetization of about 40 to 45 gauss while a fluid containing 50 g. magnetite per 100 ml. fluid will display a saturation magnetization of about 425 gauss. Viscosity and specific gravity can be varied, at least to some extent, independently of magnetite concentration by selection of carrier liquids or mediums.

Amount of dispersing agent required is not critical so long as there is enough to coat individual magnetic particles sufficiently to prevent agglomeration. Excess dispersing agent merely dissolves in the carrier liquid but large excesses are undesirable because of the increased viscosity produced in the magnetic fluid. Flocculation of the magnetic particles may also occur as a result of such excesses. On a weight basis, about 0.05 to 0.75 g. dispersing agent per g. magnetite is satisfactory. We prefer in most instances to formulate magnetic fluids containing from about 0.1 to 0.5 g. dispersing agent per g. magnetite.

As the term is used in this specification, magnetite includes all those ferroso-ferric oxides having ferromagnetic properties. It is not limited to the ideal molar ratio implied by the oxide formula $FeO \cdot Fe_2O_3$. Colloidal size particles, as the phrase is used in this specification, is restricted to particles sufficiently small so as to not settle when dispersed in a liquid even under the influence of artificially high gravitational or magnetic fields. In terms of particle diameter, colloidal particles are typically on the order of 100 Angstroms or less in size.

Referring now to FIG. 1, there is shown a magnetization curve typical of that obtained from our magnetic fluids. FIG. 2 is a magnetization curve typical of that displayed by magnetic particles suspended in a liquid. In both figures, magnetic induction B is plotted as the ordinate while the magnetic field, H, is plotted as the abscissa. As shown in FIG. 1, the magnetization curve 1, obtained from magnetic fluids consists of a symmetrical sigmoid curve about the origin. In contrast, the magnetization curve 2, obtained from a suspension of magnetic particles, displays the hysteresis loop characteristic of ferrimagnetic materials. The characteristic sigmoid magnetization curve constitutes a definitive test for the identification of a magnetic fluid.

A diagrammatic flow sheet illustrating one technique for manufacturing magnetic fluids is shown as FIG. 3. A reactor of vessel 10, preferably equipped with stirring means 11 is utilized to conduct a rapid precipitation reaction. A ferrous salt 12 and a ferric salt 13, both preferably in aqueous solution and in a molar ratio approximating 1:2, are introduced into vessel 10 where they are co-precipitated in an excess of ammonium hydroxide introduced via line 14. Precipitation must be accomplished rapidly in an excess of ammonium hydroxide in order to obtain maximum production of colloidal-size hydrated iron oxide particles. Preferably the precipitation is carried out at room temperature or below in order to avoid excessive coagulation or growth of the particles.

An aqueous slurry of the very finely divided oxide particles is then transferred via conduit 15, to a second reactor or vessel 16 also equipped with stirring or agitation means 17. A dispersing agent 18, such as oleic acid, and a solvent 19, such as kerosene, are introduced into vessel 16 and mixed with aqueous slurry 15. It is important to note that slurry or suspension 15 must contain sufficient ammonium hydroxide to completely react with dispersing agent 18 and form what essentially is an ammonium soap. Alternatively, dispersing agent 18 may be pre-reacted with ammonium hydroxide in which case the ammonium hydroxide content of slurry 15 may be reduced to a level slightly above that stoichiometrically required to precipitate the mixed ferrous and ferric hydrous oxides.

The dispersing agent functions to coat individual particles of the hydrous iron oxide and arrest further agglomeration and growth of the particles. Since the ammoniated dispersing agent is water soluble, this coating action takes place primarily in the water phase. The combined reactants within vessel 16 are heated, preferably quite rapidly, to a temperature above the decomposition temperature of the ammoniated dispersing agent. This is generally a temprature above about 75° C. For example, ammonium oleate decomposes at a temperature of 78° C., and when using oleic acid as a dispersing agent, the reaction mixture must be heated to a temperature above about 80° C. and preferably above about 90° C. Heating decomposes the ammoniated dispersing agent and free ammonia is released which is driven from solution, along with excess ammonia contained in slurry 15, and is vented from vessel 16 by means of conduit 20. Ammonia may be recovered for recycle from stream 20 by a water scrub or stream 20 may be recycled directly back to vessel 10.

Decomposition of the ammoniated dispersing agent has a drastic effect upon its solubility characteristics. The dispersing agent is no longer soluble in water but is soluble in hydrocarbons and similar liquids. Hence there occurs a transfer of dispersing agent-coated iron oxide particles from the aqueous phase to the solvent phase. Another result of heating is the development of the magnetite structure from the co-precipitated hydrous ferrous and ferric oxides. There is some indication that magnetite will develop at temperatures as low as about 50° C. but, in any event, the transformation proceeds nicely within the temperature range required to decompose the ammoniated dispersing agent.

At this stage, the reaction mixture within vessel 16 comprises a suspension of dispersing agent-coated, colloidal-size particles of magnetite in the solvent phase and an aqueous salt solution as a second phase. The mixed phases are passed via line 21 to separator vessel 22 where the phases are allowed to separate. Top phase 23 will usually comprise the suspension of magnetite in solvent since most solvents used in our process have specific gravities less than 1. Bottom phase 24 comprises an aqueous salt solution which may be discarded via line 25 or evaporated for recovery of the contained salt. The top phase is passed via conduit 26 to heater means 27 where the magnetic fluid, still containing small quantities of suspended and dissolved salt and water, is raised in temperature to facilitate the final dehydration. This heated mixture is then passed by way of means 28 to magnetic decanter 29. A localized magnetic field is applied to an area of decanter 29 as by use of an appropriate permanent or electromagnet 30. The magnetic field causes magnetic fluid to accumulate in a mass 31 within the magnetic field where it is drawn off by tapping means 32. Water and salt are voided from the decanter by way of line 33. As may be appreciated from the flow sheet and description, this embodiment of our process may be operated on a batch, semi-continuous or a continuous basis.

FIG. 4 illustrates another embodiment of our process. In this mode, we operate on a batch or semi-continuous basis. A closed vessel 40 equipped with stirring or agitation means 41 is provided to carry out the reaction. An aqueous iron containing stream is first introduced into vessel 40. This stream in turn comprises a ferrous salt stream 42 and a ferric salt stream 43 which are merged and mixed prior to or after introduction into the vessel. Ratio of ferrous to ferric iron preferably closely approximates that of magnetite. An excess of ammonium hydroxide is then introduced into the reaction vessel via means 44 with agitation to precipitate iron hydroxides. This reaction is exothermic and a substantial rise in temperature of the liquid within reactor 40 will occur. A dispersing agent 45, preferably in admixture with a solvent 46 is then added to the reaction mix with continued agitation. The reaction mix within vessel 40 is further heated by any convenient means (not shown) until the temperature of the mix is above, and preferably at least 10° C. above, the decomposition temperature of the ammonium salt of the dispersing agent.

The reaction mix, now comprising a colloidal suspension of magnetite in solvent and ammonium salt in water, is passed via conduit 47 to distillation means 48. There, the excess ammonia and water is removed as overheat stream 49. A magnetic fluid product stream 50 is also recovered from the distillation means 48 leaving a solid residual salt fraction 51. It is to be noted that this embodiment of our process requires the solvent used to have a higher boiling point than water. Solvents such as kerosene are appropriate for use ain this embodiment. Alternatively, a magnetic decanter such as was illustrated in FIG. 3, may be used to separate magnetic fluid from the water phase in place of distillation means 48.

FIG. 5 illustrates an embodiment of our process which we generally consider to be the most versatile since any compatible solvent may be used as a base for the magnetic fluid. There is provided a reaction vessel 60 with agitation means 61 into which is introduced an aqueous solution of iron salt. These iron salts preferably comprise a ferrous salt 62 and a ferric salt 63 in a ratio approximating that of magnetite. A stream of ammonium hydroxide 64, preferably in concentrated form, is added to the mixed ferrous-ferric salt solution with agitation to precipitate iron oxides and hydroxides. Ammonium hydroxide is added in excess of that required for the precipitation.

The suspension of colloidal size iron oxides is then transferred via conduit 65 to a second reaction vessel 66 also equipped with agitation means 67. A dispersing agent 68 is added to the suspension and the mixture is heated with agitation to a temperature above the decomposition temperature of the salt formed by reaction of the dispersing agent with excess ammonia contained in stream 65. Upon decomposition of the ammoniated dispersing agent, a gum-like material forms which comprises dispersing agent-coated magnetite particles. Excess ammonia is vented from vessel 66 by way of means 69. The coagulum-water-ammonium salt mixture is then passed to settling or decanting vessel 70 by way of transfer means 71. In vessel 70, the coagulum or magnetic gum, settles to the bottom since it has a relatively high specific gravity due to its magnetite content. A water stream containing dissolved salts 72 is decanted from the top of vessel 70 while a magnetic gum fraction 73 is removed from a lower point in the vessel. The last traces of entrained water are removed from the magnetic gum in drier means 74, the water being vented at 75.

A dried magnetic gum fraction 76 is recovered from drier means 74 and this may constitute the product of our process. Alternatively, the magnetic gum may be passed to a mixing or dispersing means 77 and a solvent 78 added to form a magnetic fluid product 79. Magnetic gum 76 may be considered to be a magnetic fluid concentrate and in this form offers advantages over the prepared magnetic fluid. For example, the magnetic gum may be dispersed in any one of a large variety of solvents. Transportation and storage advantages are obvious.

The process of FIG. 5 has been illustrated and described as operating on a semi-continuous or continuous basis. It may also be operated on a batch basis in which all of the processing steps are carried out within the same processing vessel.

Our invention is further explained and illustrated by the following examples.

EXAMPLE 1

A laboratory technique for the production of small quantities of magnetic fluids having reproducible characteristics has been developed. This is a "recipe" type of procedure which can be accomplished using simple apparatus and open beakers.

Dissolve 0.09 mole of ferric chloride and 0.06 mole of ferrous chloride in 50 ml. distilled water. Note that the mole ratio of ferric to ferrous iron (3 to 2) is smaller than that of magnetite (2 to 1). However, during the reaction, some ferrous iron oxidizes to ferric since the reaction is performed in open vessels. Slowly add 50 ml. of concentrated (28%) ammonium hydroxide while stirring to precipitate the iron hydroxides. Heat the mixture to 95° C. and add 50 ml. of Fisher odorless kerosene and 5 ml. of Mallinkrodt U.S.P. oleic acid with rapid stirring. Continue heating and a distinct phase separation will occur between the aqueous and organic portions.

Remove the aqueous phase using a pipette. This reduces the heating time for water removal and also eliminates most of the ammonium chloride residue. Heat until the water has evaporated and allow the temperature of the organic phase to rise to 130° C.

Cool the fluid to room temperature and pour into a graduate. Add kerosene to adjust the fluid volume to 55 ml.; this compensates for kerosene lost during heating. Vacuum filter using Whatman No. 31 paper and remove oversized particles (if any) from the fluid with a magnet.

A fluid prepared by this method will have the following nominal specifications: (1) saturation magnetization of 140 gauss at 7000 oersteds applied field; (2) a specific gravity of 0.92 g./cc.; (3) a viscosity of 2.23 centipoise measured using an Ostwald type capillary viscometer at 25° C. It is emphasized that this specific procedure is designed for the production of experimental quantities of magnetic fluid having reproducible characteristics and does not necessarily represent a preferred method of manufacture.

EXAMPLE 2

Six batches, each containing 0.04 mole of $FeCl_3 \cdot 6H_2O$ and 0.02 mole of $FeCl_2 \cdot 4H_2O$, were dissolved in water. Ammonium hydroxide was used to precipitate the colloidal iron hydroxides. Each batch of precipitate was decanted to a volume of 75 ml.

An electric fry pan was used to heat 300 ml. of the kerosene—2% oleic acid carrier fluid to 110° C. An argon atmosphere was maintained over the kerosene to prevent ignition. A Jet-Pac aerosol-type sprayer was then used to spray the aqueous suspension of hydroxides onto the kerosene. With each spray burst of hydroxide, the carrier fluid darkened, indicating the particles were going into suspension. When the spraying of a batch was completed, the fluid was cooled to room temperature. As only part of the water was lost by evaporation, the remainder, with its dissolved ammonium chloride, was removed by decantation. Some kerosene was lost by evaporation and fresh kerosene was added to return the fluid volume to 300 ml. This operation was repeated until the six batches had been sprayed.

To speed the settling of the oversized particles, a beaker containing the fluid was placed near the poles of a permanent magnet where a pipette was used to draw the fluid from the sediment. Kerosene was added to this fluid to return the volume to 300 ml.

The specific gravity of the fluid was 0.84 g./cm.$^3$ as compared to 0.77 g./cm.$^3$ for pure kerosene at the same temperature. Using this fluid it was possible to levitate copper balls of specific gravity 8.96 g./cm.$^3$ with an electromagnet at a power setting of 3 kilo-oersted (koe) and having a one-half-inch pole piece gap.

EXAMPLE 3

A portion of the fluid from example 2 was evaporated at 110° C. until its volume was halved. Argon was flowed over the fluid to prevent ignition. This concentrated fluid had a specific gravity of 0.85 g./cm.$^3$. It was possible to levitate lead of specific gravity 11.35 g./cm.$^3$ and a platinum wire of specific gravity of 21.45 g./cm.³ using power settings of 7.5 to 14.5 koe, respectively, for an electromagnet with a half-inch pole gap.

EXAMPLE 4

For this example 0.2 mole of $FeCl_3 \cdot H_2O$ and 0.1 mole of $FeCl_2 \cdot 4H_2O$ were dissolved in water and precipitated with excess ammonium hydroxide. Water was decanted until the volume of the aqueous precipitate was 200 ml. Two hundred milliliters of kerosene containing 2 percent oleic acid were heated to 110° C. in a stainless steel beaker. The beaker was fitted with a drain tube to facilitate water removal.

In this example the aqueous suspension of magnetic material was simply poured, in small amounts, onto the heated kerosene. Peptization of the magnetic material occurred as in example 2. Because the water that was not boiled away was heavier than the kerosene carrier fluid, it settled to the bottom of the beaker and was drained away.

After adding all of the magnetic material, the fluid was cooled to room temperature. A large permanent magnet was used to speed settling of the larger particles and the fluid was drawn off with a pipette. The fluid was then evaporated to 50 ml. at 110° C. using argon gas to prevent ignition. This resulted in a magnetic fluid having a specific gravity of 0.95. It was possible with this fluid to levitate an alumina ball having a specific gravity of 3.9 g./cm.³ using a small laboratory permanent magnet whose field gradient was a little less than 800 oersted/cm.

EXAMPLE 5

In this example 0.2 mole of $FeCl_3 \cdot 6H_2O$ and 0.1 mole of $FeCl_2 \cdot 4H_2O$ were dissolved in water, cooled and the hydrous oxides rapidly precipitated with excess ammonium hydroxide. Then 20 ml. of oleic acid and 40 ml. of kerosene were added while stirring to the aqueous solution of precipitate. The mixture was then heated, under argon, in a stainless steel pan to evaporate the water. When evaporation was complete, the fluid temperature was allowed to rise to 120° C. held at this point for five minutes, and then cooled to room temperature.

The resulting fluid was poured into a beaker leaving a deposit of ammonium chloride in the pan. The magnetic particles in the fluid were then flocculated by the addition of 250 ml. of acetone. A magnet was used to pull the magnetic flocculate to the bottom of the beaker while the supernatant liquid was poured away. A second addition of 200 ml. acetone was used to wash the flocculate of excess oleic acid.

After pouring away the acetone, the flocculate in the beaker was converted to a colloidal solution by adding kerosene to make the fluid volume 100 ml. The fluid was heated to 100° C. under argon to evaporate any traces of acetone. Finally, the beaker of fluid was placed near the poles of a large permanent magnet and a pipette was used to draw the fluid away from the oversized particles.

Magnetic fluid made by this technique had a specific gravity of 0.96 and it was possible to levitate an alumina sphere of specific gravity of 3.9 g./cm.³ using a small laboratory permanent magnet.

EXAMPLE 6

A grinding experiment was performed to compare the fluids prepared in the previous examples with a fluid made by ball-milling. One hundred and eighty-five grams of magnetite from Electronic Space Products, Inc., having a surface area of 7.02 m.²/g. was ground for 100 hours. The magnetite was charged into a 1.3 gallon laboratory ball mill with 7.35 kilograms of ¼-inch steel balls and 1 liter of kerosene containing 2 percent oleic acid. The fluid had a specific gravity of 0.79 when measured 48 hours after completion of grinding.

A vibrating sample magnetometer was used to compare the saturation magnetic moments per unit volume of the foregoing magnetic fluid preparations. As a criterion for the fluid magnetic strength, we measured the moment at 7 koe field strength and the results are shown in table 1. It is evident that the fluid prepared by peptization in example 4 is about 20 times as strong as the fluid prepared by grinding (example 6).

TABLE 1

| Magnetic fluid in ex. number | Scale reading, microvolts at 7 koe | Magnetic induction, $I=4\pi M$, gauss | Magnetization, M, moment/unit volume (gauss) | Sample moment relative to moment of Ex. 6 |
|---|---|---|---|---|
| 2 | 749 | 18.28 | 1.45 | 2.79 |
| 3 | 1,400 | 34.16 | 2.72 | 5.23 |
| 4 | 5,200 | 126.88 | 10.09 | 19.40 |
| 5 | 4,180 | 101.99 | 8.11 | 15.60 |
| 6 | 270 | 6.59 | .52 | 1.00 |

EXAMPLE 7

A mixture of iron salts containing 0.45 mole of ferric chloride and 0.30 mole of ferrous chloride were precipitated in an open vessel using excess ammonium hydroxide. The precipitated mixture was heated to 90° C. and 25 ml. of oleic acid, alone, was added. Heating was continued until decomposition of ammonium oleate was complete as evidenced by a cessation of ammonia evolution. A gum-like mixture formed comprising oleic acid-coated magnetic particles. This coagulum was then removed from the ammonium chloride solution and any entrained water was evaporated by further heating.

Four fluids were prepared by mixing 22 gram quantities of the oleic acid coated magnetic particles with 50 ml. of either pentane—b.p. 35° C.; hexane—b.p. 68° C.; n-heptane—b.p. 98° C.; or kerosene—b.p. >180° C. The saturation magnetization $M_s$, density, and viscosity of these fluids are given as follows:

TABLE 2

| Carrier fluid | $M_s$, gauss | Density, g./ml. | Viscosity, centipoise |
|---|---|---|---|
| Pentane | 160 | .785 | 0.361 |
| Hexane | 170 | .836 | 0.491 |
| n-Heptane | 170 | .848 | 0.702 |
| Kerosene | 190 | .938 | 2.352 |

EXAMPLE 8

The relationship between saturation magnetization and magnetite concentration of magnetic fluids was investigated. For the system of magnetite in kerosene using oleic acid as a dispersing agent, it was found that saturation magnetization was a linear function of magnetite concentration. For each 10 g. of magnetite dispersed in 100 ml. of fluid, the saturation magnetization increased approximately 85 gauss. This linear relationship held true over the entire range investigated; from 0 to 50 g. magnetite per 100 ml. of magnetic fluid.

EXAMPLE 9

A quantity of waste pickling liquor was obtained from a steel mill and a partial chemical analysis was performed. The results are as follows reported in g./l.

TABLE 3

| Fe (total) | $Fe^{2+}$ | Mn | Cr | Ni | Cu | Free HCl |
|---|---|---|---|---|---|---|
| 99.93 | 98.07 | 0.41 | 0.008 | 0.015 | 0.013 | 30.20 |

The pickle liquor was evaluated as a source of ferrous salt in the production of magnetic fluids using the procedure set out in Example 1. Thirty four ml. of waste pickle liquor was substituted for the ferrous chloride normally used. Since free hydrochloric acid was present in the pickle liquor, the volume of ammonium hydroxide used for precipitation was increased from 50 to 55 ml.

The saturation magnetization of the magnetic fluid produced was in excess of 140 gauss and was essentially indisinguishable from fluids produced using reagent grade chemicals.

EXAMPLE 10

In this example, the pickle liquor of Example 9 was used as the source of both ferrous and ferric iron to synthesize magnetic fluids by the technique of Example 1. Ferric chloride was produced by oxidizing the ferrous iron in the pickle liquor with hydrogen peroxide. Excess hydrogen peroxide was removed from the oxidized solution by boiling. Oxidized pickle liquor in the amount of 51 ml. was mixed with 34 ml. of pickle liquor in the "as received" state. Precipitation was accomplished using 55 ml. of ammonium hydroxide. Saturation magnetization of the magnetic fluid produced was in excess of 140 gauss. It could not be distinguished in physical properties from the magnetic fluids produced in Examples 1 and 9.

EXAMPLE 11

The procedure of Example 1 was repeated except that a stoichiometric quantity of ammonium hydroxide was used to precipitate the ferroso-ferric oxide, when the kerosene-oleic acid mixture was added to the precipitate, magnetic fluid failed to form. It was postulated that the oleic acid remained in the kerosene phase and did not act as a dispersant for the colloloidal iron oxide particles. An additional amount of ammonium hydroxide was then added to the mixture. A magnetic fluid immediately formed. It is believed that oleic acid reacted with the additional or excess ammonium hydroxide to form ammonium oleate which is water soluble but not hydrocarbon soluble. Ammonium oleate, now soluble in the water phase, was then adsorbed on the surface of the colloidal magnetite particles and, since the temperature of the mixture was above the decomposition temperature of the ammonium oleate, decomposed to again form oleic acid. Since oleic acid is soluble in hydrocarbons but not in water, magnetite particles coated with adsorbed oleic acid are extracted into the hydrocarbon phase thus forming a magnetic fluid.

EXAMPLE 12

The procedure of Example 1 was repeated except that an excess of sodium hydroxide, instead of ammonium hydroxide, was used to precipitate the ferroso-ferric oxide. Upon addition of the kerosene-oleic acid mixture, a magnetic fluid failed to form. Sodium oleate, although soluble in water, will not decompose at low to moderate temperatures as does ammonium oleate. Hence, magnetite particles having an adsorbed oleic acid coating are not produced thus preventing the formation of a magnetic fluid.

We claim:

1. A process for producing magnetic fluids from aqueous industrial waste streams containing ferrous iron salts which comprises:
   oxidizing a portion of the ferrous iron contained in the waste stream to the ferric state;
   reacting the waste stream, now containing ferrous and ferric iron salts, with an excess of ammonium hydroxide to precipitate a slurry of colloidal size ferroso-ferric iron oxide particles;
   adding a long chain fatty acid having about 18 carbon atoms to the iron oxide particle slurry whereby the fatty acid reacts with ammonium hydroxide to form an ammonium salt of the fatty acid and to thereafter coat iron oxide particles contained in the slurry with an adsorbed layer of ammoniated fatty acid;
   heating the slurry to a temperature above the decomposition temperature of the ammoniated fatty acid to convert the adsorbed layer of ammoniated fatty acid to the acid form and to expel ammonia from the slurry, and
   recovering from the slurry a product fraction comprising ferrimagnetic iron oxide particles of colloidal size coated with an adsorbed layer of fatty acid.

2. The process of claim 1 wherein the ratio of ferrous to ferric iron salts contained in the oxidized waste stream approximates that of magnetite.

3. The process of claim 2 wherein the iron salts are chosen from the group consisting of chlorides and sulfates.

4. The process of claim 3 wherein the fatty acid-coated ferrimagnetic particles are dispersed in a liquid hydrocarbon to form a magnetite fluid.

5. The process of claim 4 wherein the aqueous industrial waste stream is a pickling liquor.

6. The process of claim 5 wherein the hydrocarbon is chosen from the group consisting of kerosene and fuel oils and wherein the fatty acid comprises a tall oil.

7. The process of claim 6 wherein the magnetic fluid contains from about 5 to about 50 grams of ferrimagnetic iron oxides per 100 milliliters of fluid.

8. A method for preparing non-agglomerating ferrimagnetic particles of colloidal size which consists essentially of:
   reacting an aqueous solution of iron salts with a base to precipitate a slurry of colloidal size iron oxide particles having ferrimagnetic properties;
   coating the surface of the iron oxide particles contained in the slurry with an adsorbed layer of a dispsersing agent comprising at least one fatty acid having about 18 carbon atoms, said dispersing agent being in a water soluble form;
   heating the slurry of dispersing agent-coated particles to a temperature sufficient to decompose the dispersing agent and to transform it to a non-water soluble form, and
   separating from the slurry a fraction comprising dispersing agent-coated ferrimagnetic iron oxide particles.

9. The process of claim 8 wherein the dispersing agent in its water soluble form comprises an ammonium salt of the fatty acid and wherein the dispersing agent in its non-water soluble form is the corresponding fatty acid.

10. The process of claim 9 wherein ammonium hydroxide is present in the aqueous slurry during the coating step.

11. The process of claim 10 wherein the base used to precipitate the iron oxide particles is ammonium hydroxide.

12. The process of claim 8 wherein the iron salt soluble is reacted with ammonium hydroxide at room temperature or below and wherein an excess of ammonium hydroxide over that required to completely precipitate the iron salts is added to the slurry.

13. The process of claim 12 wherein the fatty acid dispersing agent is added to the iron oxide slurry and therein reacts with excess ammonium hydroxide contained in the slurry to form a water soluble ammonium salt.

14. The process of claim 13 wherein the ratio of ferrous to ferric ions contained in the iron salt solution approximates that of magnetite.

15. The process of claim 14 wherein the iron salts are chosen from the group consisting of chlorides and sulfates.

16. The process of claim 15 wherein the dispersing agent-coated ferrimagnetic iron oxide particle fraction is further heated to separate entrained water and is thereafter dispersed in a non-aqueous carrier liquid to form a magnetic fluid.

17. The process of claim 16 wherein the carrier liquid is hydrocarbon.

18. The process of claim 17 wherein the magnetic fluid has a saturation magnetization in the range of about 50 to 500 gauss.

19. The process of claim 15 wherein a carrier liquid is added to the iron oxide slurry prior to the decomposition of the ammoniated fatty acid, said carrier liquid being immiscible in water and having a solubility for the dispersing agent in its non-ammoniated form whereby fatty acid-coated ferrimagnetic iron oxide particles are transferred from the water slurry to the carrier liquid and thereby form a magnetic fluid.

20. The process of claim 19 wherein the carrier liquid is a hydrocarbon and wherein the fatty acid comprises oleic acid.

21. The process of claim 20 wherein the hydrocarbon is chosen from the group consisting of kerosene and fuel oils and wherein the magnetic fluid contains from about 5 to 50 grams of ferrimagnetic iron oxide particles per 100 milliliters of magnetic fluid.

22. The process of claim 21 wherein the magnetic fluid contains from about 0.05 to 0.75 grams of oleic acid per gram of iron oxide.

23. A method for effecting a transfer of colloidal size magnetic particles from an aqueous medium to a non-aqueous medium which comprises:
forming a suspension of colloidal size magnetic particles in water;
adding to the suspension a water soluble ammonium salt of a fatty acid having about 18 carbon atoms and agitating the mixture to form an adsorbed layer of ammoniated fatty acid on the surface of the suspended particles;
heating the suspension to a temperature above the decomposition point of the ammoniated fatty acid to produce free ammonia and to transform the adsorbed layer of ammoniated fatty acid to fatty acid;
separating ammonia evolved during decomposition of the ammoniated fatty acid from the suspension;
contacting the fatty acid-coated colloidal size magnetic particles with a non-aqueous liquid, said liquid being immiscible with water and having a solubility for the carboxylic acid, and
recovering a stable suspension of colloidal size magnetic particles dispersed in the non-aqueous liquid.

24. The process of claim 23 wherein the magnetic particles comprise magnetite.

25. The process of claim 24 wherein the non-aqueous liquid is a hydrocarbon and wherein the carboxylic acid comprises oleic acid.

26. The process of claim 25 wherein the hydrocarbon is chosen from the group consisting of kerosene and fuel oils.

References Cited

UNITED STATES PATENTS

| | | | |
|---|---|---|---|
| 3,480,555 | 11/1969 | Jackson et al. | 252—62.56 |
| 3,531,413 | 9/1970 | Rosensweig | 252—62.56 |
| 3,635,819 | 1/1972 | Kaiser | 252—62.51 |
| 3,700,595 | 10/1972 | Kaiser II | 252—62.51 |
| 3,764,540 | 10/1973 | Khalafalla et al. | 252—62.56 |

OTHER REFERENCES

Elmore, Phys. Reviews, 54 (1938), pp. 309–10.

PATRICK P. GARVIN, Primary Examiner

A. P. DEMERS, Assistant Examiner

U.S. Cl. X.R.

252—62.51, 62.56